United States Patent [19]

Spycher

[11] 4,246,207
[45] Jan. 20, 1981

[54] METHOD FOR CASTING GLASS-PLASTIC LENSES COMPRISING ALLYL DIGLYCOL CARBONATE PLASTIC

[75] Inventor: Anton A. Spycher, Big Flats, N.Y.

[73] Assignee: Corning Glass Works, Corning, N.Y.

[21] Appl. No.: 38,864

[22] Filed: May 14, 1979

Related U.S. Application Data

[63] Continuation-in-part of Ser. No. 839,494, Oct. 5, 1977, abandoned.

[51] Int. Cl.$^3$ .............................................. B29D 11/00
[52] U.S. Cl. ....................................... 264/1; 249/134; 425/808
[58] Field of Search ....................... 264/1, 2; 425/808; 249/134

[56] References Cited

U.S. PATENT DOCUMENTS

| | | | |
|---|---|---|---|
| 2,233,057 | 2/1941 | Luce | 425/808 |
| 2,304,663 | 12/1942 | Smith et al. | 425/808 |
| 2,640,227 | 6/1953 | Johnson | 264/1 |
| 3,322,598 | 5/1967 | Marks et al. | 264/1 |
| 3,423,488 | 1/1969 | Bowser | 264/1 |
| 4,091,057 | 5/1978 | Weber | 264/1 |

FOREIGN PATENT DOCUMENTS 2204830  8/1973  Fed. Rep. of Germany ........... 249/134

OTHER PUBLICATIONS

*Glass, Its Industrial Applications,* C. J. Phillips, Reinhold, N.Y.C., pp. 191–195.

Primary Examiner—James B. Lowe
Attorney, Agent, or Firm—Kees van der Sterre; Clinton S. Janes, Jr.

[57] ABSTRACT

A process for producing laminated glass-plastic lenses utilizing optically finished glass-ceramic mold components having specified thermal expansion, strength and thermal conductivity characteristics in a direct casting procedure wherein the lenses are cooled in the molds after curing to provide high selections of physically durable lenses.

3 Claims, No Drawings

… … …

METHOD FOR CASTING GLASS-PLASTIC LENSES COMPRISING ALLYL DIGLYCOL CARBONATE PLASTIC

CROSS-REFERENCE TO RELATED APPLICATION

This application is a continuation-in-part of my earlier-filed copending application, Ser. No. 839,494, filed Oct. 5, 1977 now abandoned.

BACKGROUND OF THE INVENTION

The present invention relates to a process for casting thermosetting resins, specifically to a casting process useful for manufacturing laminated ophthalmic lenses containing allyl diglycol carbonate thermosetting resins.

Diethylene glycol bis(allyl carbonate) resin, a specific thermosetting resin commercially available as CR-39 ® resin, is presently used to produce finished and semi-finished ophthalmic lenses by casting processes. The molds presently used for casting such lenses include glass components having optically finished resin contact surfaces which contain the resin during curing and form the front and/or back surfaces of the cast lens.

Mold properties which are important for this process include mold strength, thermal expansion, and thermal conductivity, and also the finishing and resin parting characteristics of the mold. Good thermal conductivity is required so that the mold will readily transmit heat to and from the resin during the curing cycle. The mold material must have a low thermal expansion coefficient so that the mold curvature during curing at elevated temperatures will not differ significantly from its curvature at room temperatures.

In order to realize useful mold life, the strength of the mold must be high and the forces necessary to part the mold from the cured resin must be relatively low. Otherwise mold breakage will occur and, in the case of excess adherence between the resin and mold, low lens selection rates due to lens cracking and/or surface defects are encountered.

On the other hand, some minimum adherence between the curing resin and the optical surfaces of the mold is required. A mold which "self-releases" during curing produces a lens which is out of curvature, or which exhibits a "milky" or mottled surface. It is necessary that the surfaces of the cured lens accurately reproduce the optical surface quality of the mold if a subsequent lens polishing step is to be avoided.

Glass-ceramics are relatively new materials exhibiting properties which are in certain respects superior to those of glasses. See, for example, *Glass, Its Industrial Applications*, C. J. Phillips, Reinhold, New York (1960), pp. 191-195. These materials have been used for forming softened glass in the glass industry, as suggested in U.S. Pat. No. 4,052,184 to Anderson, and have been proposed for use in making injection mold inserts for molding thermoplastic resins at elevated temperatures and pressures as in German OLS No. 2,204,830.

Notwithstanding these facts, the mold material most widely used at present for the casting of finished plastic lenses is white crown glass. Typical properties for such glass are an average linear thermal expansion coefficient (0°-300° C.) of about $96 \times 10^{-7}/°C.$, a room temperature thermal conductivity of about 0.0024 cal/cm. sec.°C., and a modulus of rupture strength of about 7,000 psi.

Glasses exhibit the necessary adherence to allyl digycol carbonate resins during curing so that self-release leading to poor surface quality and/or out-of-curvature lenses is largely avoided. Also, glass molds are relatively easily parted from cured plastic lenses, provided that the current industry practice of separating the lenses from the molds at relatively high temperatures, e.g., 60° C. or above, is followed.

Recently it has been proposed to provide light weight glass-plastic laminated lenses comprising bonded thin glass and allyl diglycol carbonate laminae by direct casting of the liquid monomer into molds containing thin elements of sheet glass. Hence my copending, commonly assigned application, Ser. No. 27,231, filed Apr. 5, 1979, describes the production of laminated glass-plastic lenses by a direct casting technique. However, it has been found that such laminated lenses cannot be economically manufactured if removed from the molds at the high mold separation temperatures commonly employed in the plastic lens manufacturing industry. High temperature separation has been found to lead to a high incidence of stress failure on subsequent testing of laminated lenses produced in this manner.

On the other hand, it has been found that if plastic lenses are cooled to relatively low temperatures (e.g., room temperature) in contact with glass molds, separation of the plastic from the mold is quite difficult, and cracking of the plastic during the removal of the glass mold frequently results.

It is a principal object of the present invention to provide a method for producing glass-plastic laminated lenses economically through the use of a new mold material and manufacturing process.

It is a further object of the invention to provide a manufacturing process offering higher selection rates and a broader range of permissible lens design parameters than prior art processes.

Other objects and advantages of the invention will become apparent from the following detailed description thereof.

SUMMARY OF THE INVENTION

The invention broadly encompasses a method for manufacturing glass-plastic lenses by a direct casting process which is characterized by the use of a glass-ceramic material for the casting mold, and by the use of a cooling step following curing, wherein the lenses are cooled while in contact with the mold to a temperature sufficient to reduce the incidence of stress breakage in the final product. The method is useful for the production of any laminated lens which includes at least one cured allyl diglycol carbonate plastic laminar element or layer contacting a portion of the mold during curing and cooling, and at least one laminar glass element or layer bonded to the plastic element.

The use of a glass-ceramic material for the portion of the mold to be in contact with the allyl diglycol carbonate plastic during curing and cooling is critical if the low temperature mold separation characteristics necessary for economical lens manufacture are to be obtained. The glass-ceramic material to be used for the fabrication of the mold component or components is one which is surface-finishable to optical quality i.e., to a surface roughness not exceeding about 1 μm. Fine-grained glass-ceramics can be surface-finished to better than 1 μ surface roughness utilizing grinding and polishing techniques of the kind used for finishing glass.

The glass-ceramic material used for the mold also has a modulus of rupture strength of at least about 10,000 psi, a thermal conductivity of at least about 0.0040 cal/sec.cm.°C., and an average linear coefficient of thermal expansion not exceeding about $60 \times 10^{-7}$/°C.

A particularly advantageous and unexpected property of an optically finished glass-ceramic mold surface is a nearly ideal release characteristic from cured diethylene glycol bis(allyl carbonate) resin. Parting between the glass-ceramic mold and the cured resin occurs substantially more readily at room temperatures than when glass molds are employed. This circumstance is evidenced by improved lens selection rates which are obtained with glass-ceramic molds, and by the fact that much thinner lenses of good quality may be produced using glass-ceramic molds than with the glass molds of the prior art. Nevertheless, glass-ceramic mold components are not self-releasing from these resins at plastic curing temperatures, so that good surface quality in the molded product is provided.

It is very important, in the manufacture of a laminated glass-plastic lens by direct casting, that the lens be cooled in the mold, following curing therein, to a temperature not exceeding about 40° C., and preferably to a temperature not exceeding about 30° C., before removal of the cast lens from the mold is undertaken. Laminated glass-plastic lenses produced by direct casting are normally in a stressed state at room temperature in any case, due to the large difference in thermal expansion between the glass and plastic layers. Apparently, these stresses are intensified or otherwise modified if the laminated lens is removed from the casting mold at high temperatures, with the result that the prematurely removed lens is more apt to suffer stress failure in use. Through the use of a glass-ceramic mold material it is possible to permit the cast lens to cool in the molding assembly, and yet to separate the cooled lens from the mold without excessive losses due to plastic cracking.

The following example demonstrates the importance of cooling in the molds for laminated glass-plastic lenses provided by direct casting.

DETAILED DESCRIPTION

An example of one type of glass-ceramic material particularly useful for mold fabrication in accordance with the invention is a low-expansion glass-ceramic of lithium aluminosilicate composition. Many such glass-ceramics are known and described in the literature, particular examples being Corning Codes 0336 and 9608 glass-ceramic materials. Lithium aluminosilicate glass-ceramics of this type typically exhibit expansion coefficients not exceeding about $15 \times 10^{-7}$/°C. (0°–300° C.). Such glass-ceramics provide not only low thermal expansion but also high strength, thus permitting the manufacture of thinner molds which last longer than the glass molds presently used for lens casting.

To illustrate the importance of material selection for the fabrication of molds for curing allyl diglycol carbonate resins, Table I below compares some key properties of candidate materials for mold design. Included in Table I are approximate literature values for thermal conductivity, thermal expansion coefficient, and abraded modulus of rupture strength for various materials. Thermal conductivity values are as reported at 100° C., while all modulus of rupture strengths are for abraded materials. Thermal expansion values are reported as average values over the temperature range 0°–300° C.

TABLE I

| Mold Material | Thermal Conductivity (cal/cm . sec . °C.) $\times 10^4$ | Thermal Expansion Coefficient (°C.$^{-1}$) $\times 10^{-7}$ | Modulus of Rupture Strength (psi) |
|---|---|---|---|
| white crown glass | 24 | 96 | 7000 |
| borosilicate glass | 30 | 33 | 7000 |
| fused silica | 35 | 5.5 | 6000 |
| soda-lime glass | 27 | 92 | 7000 |
| high-lead glass | 14 | 90 | 6000 |
| lithium aluminosilicate glass-ceramic (Corning Code 0336) | 47 | 12 | 15,000 |

Although the data in Table I demonstrate the superiority of glass-ceramic materials for mold fabrication from the standpoint of strength and thermal properties, by far the most critical characteristic for this application is parting behavior. The marginal parting characteristics of white crown glass with respect to allyl diglycol carbonate resins at room temperature is generally shared by the other glassy materials in Table I, including fused silica. In contrast, molds fabricated from low-expansion lithium aluminosilicate glass-ceramic materials are considerably easier to part from such resins at temperatures of 40° C. and below than any of the glass molds tested.

Taking the white crown glass molds as representative of prior art molds with respect to parting behavior, tests run between glass molds and glass-ceramic molds to determine the effect of mold properties, particularly room temperature parting behavior, on lens selection have demonstrated that substantial selection improvements for lenses comprising allyl diglycol carbonate plastic are obtained with glass-ceramic molds. These selection improvements are more fully shown by the following illustrative examples.

EXAMPLE 1

Molten glass having an approximate composition, in parts by weight as calculated from the batch, of about 62.5 parts $SiO_2$, 20.3 parts $Al_2O_3$, 3.5 parts $Li_2O$, 1.9 parts MgO, 4.8 parts $TiO_2$, 2.3 parts ZnO and 0.9 parts $As_2O_3$ is pressed into a series of spherically curved glass shell molds about 4 mm thick and 105 mm in diameter. The curvature of the molds is such as to impart approximately 6¼ diopter curvature (for n×1.5) to the surfaces of plastic moldings shaped in conformity thereto.

The glass shell molds thus provided are thermally crystallized to provide glass-ceramic molds by processing through a heat treatment comprising heating to a temperature of about 750° C. at a rate of about 900° C./hr. holding at 750° C. for 3 hrs., further heating to a temperature of about 1000° C. at a rate of about 500° C./hr., holding at 1000° C. for 5 hrs., cooling to 800° C. at a rate of 500° C./hr., holding at 800° C. for 1 hour, finally cooling to room temperature at a rate of 900° C./hr. The resulting glass-ceramic shell molds have a modulus of rupture strength of about 15,000 psi, a thermal conductivity of about 0.0047 cal/cm.sec.°C., and an average linear coefficient of thermal expansion (0–300° C.) of about $12 \times 10^{-7}/°C$. The sides of these glass-ceramic shell molds are then ground and polished to a surface roughness of about 0.3 μm utilizing conventional glass finishing techniques.

Using these molds, an experimental program is conducted wherein 445 all-plastic meniscus lenses are produced by conventional casting techniques. Each casting is formed by injecting a mixture of diethylene glycol bis (allyl carbonate) resin and an isopropyl percarbonate polymerization catalyst into a cavity formed by two of the molds and a plastic ring gasket. Each plastic ring gasket has a thickness slightly over 2 mm and an inner diameter of about 70 mm.

Each mold assembly with its contained resin is then clamped and processed through a standard resin curing cycle comprising controlled heating to 100° C. over a heating interval of 14 hours, followed by cooling to room temperature. The molds are then separated from the cured castings, with separation occuring substantially more readily than when glass molds are employed.

Examination of the results of this experimental program indicates that 65 lenses with cracking defects and 13 lenses with surface defects attributable to self-release during curing were produced while 367 select lenses were obtained providing an overall selection rate of about 82%. The surface quality of the selected lenses was good, and the correspondence in curvature between these lenses and the mold surfaces at room temperature is excellent.

EXAMPLE 2

A series of 92 2 mm-thick all-plastic meniscus lenses were produced in accordance with the procedure described in Example 1, except that white crown glass molds rather than glass-ceramic molds were used for production. The glass molds were formed from a white crown glass having a modulus of rupture strength of 7000 psi, a thermal conductivity of 0.0024 cal/cm-.sec.°C., and an average linear coefficient of thermal expansion (0–300° C.) of about $96 \times 10^{-7}$. The curing cycle of Example 1 was used for curing the diethylene gylcol bis(allyl carbonate) resin; thus the lenses were not removed hot from the molds in accordance with conventional industry practice, but rather were removed after the lenses had reached temperatures of about 20° C.

Separation of the lenses from the glass molds at these temperatures was difficult, requiring the application of strong prying forces. This resulted in a higher incidence of lens cracking during separation, such that 26 lens with cracking defects, 2 lenses with surface defects attributable to self-release during curing, and 64 select lenses were produced. Thus an overall selection rate of about 69% was achieved.

EXAMPLE 3

A series of 240 1 mm-thick all plastic meniscus lenses was produced in accordance with the procedure of Example 1, utilizing the glass-ceramic molds therein described together with plastic ring gaskets about 1 mm in thickness. The resin curing cycle utilized for these lenses comprises controlled heating to 90° C. over a heating interval of about 12 hours, followed by cooling to room temperature. Separation from the molds was readily accomplished.

Examination of the molded lenses produced by this process indicated that 78 lenses with cracking defects, 5 lenses with self-release marks, and 157 select lenses were produced, for an overall selection rate of 65%. These results may be contrasted with the results obtained from similarly molding 28 all-plastic lenses of 1 mm thickness using the glass molds of Example 2. Separation of the lenses from the molds at room temperature was quite difficult, such that 14 of the lenses had cracking defects, 8 had self-release surface marking defects, and 6 were essentially defect-free, for a selection rate of about 21%.

EXAMPLE 4

A series of 80 4 mm-thick all-plastic meniscus lenses was produced in accordance with the procedure of Example 1, utilizing the glass-ceramic molds therein described together with plastic ring gaskets about 4 mm in thickness. The resin curing cycle utilized for these lenses comprised controlled heating to 100° C. over a heating interval of about 16 hours, followed by cooling of the lenses to room temperature prior to separation from the molds.

Examination of the cured lenses produced by this process indicated that no lenses with cracking defects and no lenses with self-release marks were produced for an overall selection rate of 100%. These results may be contrasted with the results obtained from similarly molding 26 all-plastic lenses of 4 mm thickness using the glass molds of Example 2. Of these lenses, 1 had a cracking defect, 3 had self-release marks, and 22 were essentially defect-free for a selection rate of about 85%.

EXAMPLE 5

A total of 8 laminated glass-plastic lenses comprising opposing plastic surface layers bonded to a central glass core are provided. These lenses are produced by casting catalyzed diethylene glycol bis(allyl carbonate) resin against both sides of an adhesive-coated glass sheet in a molding assembly to provide plastic surface layers about 2 mm thick on each side of the sheet glass core, which is about 0.018 inches in thickness. Four of the lenses were cast in glass-ceramic shell molds as described in Example 1, and four were cast in white crown glass shell molds as described in Example 2.

The plastic surface layers were cured in contact with the mold surface by slow heating to 95° C. over a 20-hour heating interval. Cooling of the molds and lenses was then commenced, and at a temperature of about 80° C., two of the glass-molded lenses and two of the glass-ceramic molded lenses were separated from their respective shell molds.

In all cases separation from the molds was readily accomplished. However, the laminated lenses exhibited excessive stresses at room temperature, based on polarimeter measurements, and all failed immediately through stress fracture when subjected to an edging technique suitable for edging laminated lenses.

Cooling of the remaining four lenses while in contact with their respective molds was continued until a temperature of 30° C. was reached, at which time separation of the lenses from the molds was attempted. The lenses cast in the glass-ceramic molds were readily separated therefrom with moderate prying pressure, and did not fail through stress fracture when subjected to the edging technique for laminated lenses.

In contrast, the lenses cast in the glass molds were not readily separable therefrom with moderate prying pressure. It was found that cooling of the lenses in the molds to a temperature of −20° C. was required before separation could be achieved with prying forces low enough to avoid the possibility of plastic cracking during separation. Thus it was concluded that the use of the glass-ceramic molds in combinations with the step of cooling the laminated lenses in the molds substantially improved the efficiency of the direct cast lens manufacturing process.

Of course the foregoing examples are merely illustrative of molding processes and glass-ceramic mold materials which could be employed in accordance with the invention to provide high quality cast lenses from allyl diglycol carbonate resins. Nevertheless it is apparent from the examples that substantial improvements in molding efficiency are obtainable through the use of the glass-ceramic molds of the invention, provided that a glass-ceramic mold material is selected which is finishable to optical quality, possesses low thermal expansion, and exhibits good thermal conductivity and high strength as hereinabove described.

I claim:

1. A direct casting process for making a glass-plastic laminated lens comprising at least one glass layer and at least one plastic layer consisting of a cured allyl diglycol carbonate resin bonded to the glass layer, the process comprising the steps of positioning a glass sheet for the glass layer in a mold, injecting liquid allyl diglycol carbonate resin for the plastic layer into the mold and against the glass sheet, and heat curing the resin while in contact with the glass and mold to provide the glass-plastic laminated lens, wherein:

(a) the portion of the mold contacted by the plastic resin upon casting and during heat curing is fabricated from a glass-ceramic material having a surface roughness not exceeding one micron, a abraded modulus of rupture strength of at least about 10,000 psi, a thermal conductivity of at least about 0.0040 cal/sec.cm.°C., and an average linear coefficient of thermal expansion not exceeding about $60 \times 10^{-7}$/°C. over the temperature range of 0°–300° C., and (b) the glass-plastic laminated lens is cooled in the mold, following heat curing, for a cooling interval at least sufficient to reduce the temperature of the lens to about 40° C.

2. A process in accordance with claim 1 wherein the glass-ceramic material is a lithium aluminosilicate glass-ceramic material having an average linear coefficient of thermal expansion not exceeding about $15 \times 10^{-7}$/°C. over the temperature range 0°–300° C.

3. A process in accordance with claim 1 wherein the glass-plastic laminated lens is cooled in the mold for a cooling interval at least sufficient to reduce the temperature of the lens to about 30° C.

* * * * *